US009508201B2

(12) United States Patent
Bhogal et al.

(10) Patent No.: US 9,508,201 B2
(45) Date of Patent: Nov. 29, 2016

(54) IDENTIFYING THE ORIGINS OF A VEHICULAR IMPACT AND THE SELECTIVE EXCHANGE OF DATA PERTAINING TO THE IMPACT

(71) Applicant: INTERNATIONAL BUSINESS MACHINES CORPORATION, Armonk, NY (US)

(72) Inventors: Kulvir S. Bhogal, Fort Worth, TX (US); Gregory J. Boss, Saginaw, MI (US); Jill S. Dhillon, Houston, TX (US); Rick A. Hamilton, II, Charlottesville, VA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/592,940

(22) Filed: Jan. 9, 2015

(65) Prior Publication Data

US 2016/0203656 A1 Jul. 14, 2016

(51) Int. Cl.

| | |
|---|---|
| ***G01M 17/00*** | (2006.01) |
| ***B60Q 1/00*** | (2006.01) |
| ***G07C 5/08*** | (2006.01) |
| ***G07C 5/00*** | (2006.01) |

(52) U.S. Cl.
CPC ............. *G07C 5/0808* (2013.01); *G07C 5/008* (2013.01); *G07C 5/085* (2013.01)

(58) Field of Classification Search
USPC .......................................... 701/32.2; 340/436
See application file for complete search history.

(56) References Cited

U.S. PATENT DOCUMENTS 6,211,777 B1 * 4/2001 Greenwood ............. B60Q 1/52 180/272
6,741,168 B2 5/2004 Webb et al.
(Continued)

FOREIGN PATENT DOCUMENTS

KR 20130006910 1/2013

OTHER PUBLICATIONS

IST Awarded Patent on New, Compact, 6 Axis Data Recorder., http://www.isthq.com/PressReleases/ISTAwardedPatent.aspx, Jun. 27, 2006, 2 pages.
(Continued)

*Primary Examiner* — Thomas G Black
*Assistant Examiner* — Tyler Paige
(74) *Attorney, Agent, or Firm* — John Pivnichny; Andrew M. Calderon; Roberts Mlotkowski Safran Cole & Calderon, P.C.

(57) ABSTRACT

Approaches are provided for identifying the origin of a vehicular impact and selectively exchanging data pertaining to the impact. An approach includes determining whether an impact to a vehicle exceeds a predetermined threshold. The approach further includes when the impact exceeds the predetermined threshold, sending a signal that includes impact information and identifier information stored in a persistent storage device. The approach further includes receiving signals from one or more other vehicles within a predetermined proximity of the vehicle. The approach further includes comparing impact information from the signals to the impact information stored in the persistent storage device. The approach further includes when the impact information from the signals matches the impact information stored in the persistent storage device within a tolerance threshold, storing the impact information and identifier information from the signals in the persistent storage device.

20 Claims, 6 Drawing Sheets

(56) References Cited

U.S. PATENT DOCUMENTS

| | | | | |
|---|---|---|---|---|
| 6,982,625 | B2 | 1/2006 | Chainer et al. | |
| 7,069,118 | B2 | 6/2006 | Coletrane et al. | |
| 7,495,550 | B2 | 2/2009 | Huang et al. | |
| 8,121,753 | B2 | 2/2012 | Bauchot et al. | |
| 8,799,034 | B1 * | 8/2014 | Brandmaier | 705/4 |
| 2002/0027499 | A1 * | 3/2002 | Chainer | G07C 5/008 340/426.24 |
| 2003/0112133 | A1 * | 6/2003 | Webb | G07C 5/008 340/436 |
| 2003/0139881 | A1 * | 7/2003 | Miller | B60R 21/013 701/301 |
| 2005/0071052 | A1 * | 3/2005 | Coletrane | G07C 5/008 701/1 |
| 2007/0096885 | A1 * | 5/2007 | Cheng | B60W 40/04 340/435 |
| 2007/0257782 | A1 | 11/2007 | Etcheson | |
| 2008/0282583 | A1 * | 11/2008 | Koellner | E02F 3/304 37/348 |
| 2008/0306996 | A1 * | 12/2008 | McClellan | G06Q 10/06 |
| 2009/0027188 | A1 * | 1/2009 | Saban | B60N 2/002 340/521 |
| 2009/0228157 | A1 * | 9/2009 | Breed | G08G 1/161 701/1 |
| 2011/0004360 | A1 * | 1/2011 | Kolatschek | B60R 21/0136 701/1 |
| 2013/0300552 | A1 * | 11/2013 | Chang | B60Q 9/00 340/436 |
| 2014/0012492 | A1 | 1/2014 | Bowers et al. | |
| 2014/0310702 | A1 * | 10/2014 | Ricci | H04W 48/04 717/173 |

OTHER PUBLICATIONS

Michelle V. Rafter, Decoding What's in Your Car's Black Box., http://www.edmunds.com/car-technology/car-black-box-recorders-capture-crash-data.html, Republished: Jul. 22, 2014 (Original Date: Dec. 18, 2012), 5 pages.

Kopylova et al.,"Accurate Accident Reconstruction in VANET", Dept. of CSE, University of South Carolina (kopylova,farkas,wyxu)@cse.sc.edu, IFIP International Federation for Information Processing 2011, 9 pages.

Rahman et al.,"Secure Crash Reporting in Vehicular Ad hoc Networks",Security and Privacy in Communications Networks and the Workshops, Third International Conference on. IEEE, Mar. 26, 2007, 20 pages.

* cited by examiner

IDENTIFYING THE ORIGINS OF A VEHICULAR IMPACT AND THE SELECTIVE EXCHANGE OF DATA PERTAINING TO THE IMPACT

FIELD OF THE INVENTION

The technical character of the present invention generally relates to vehicular impact detection and reporting, and more particularly, to systems and methods for identifying the origin of a vehicular impact and selectively exchanging data pertaining to the impact.

BACKGROUND

Drivers and motor vehicles are occasionally involved in traffic collisions. Resolution of disputes of traffic collisions conventionally depend on participants exchanging information (e.g., identification and insurance information), and participants and eyewitnesses reporting their respective versions of the collisions. However, collision information is sometimes not accurately reported, for example, participants may provide conflicting facts of a collision including the speed each vehicle was traveling or sequence of events in the collision. A participant may also misrepresent the facts of the collision, or leave the scene of the collision without exchanging any information. Consequently, vital information regarding the collision may be lost to law enforcement investigators or to a participant's insurance company.

One such approach to overcome the loss of vital information regarding traffic collisions involves manufacturers voluntarily installing event data recorders (EDRs) as standard equipment in vehicles. The information and data collected from the EDRs may be used to aid law enforcement investigators and insurance companies in identifying the causes or severity of impacts, and to improve insurance processing efficiencies, motor vehicle safety systems, and standards. However, the EDRs typically do not exchange the information and data collected with other participants and/or vehicles involved in the traffic collision, and therefore are limited in their usefulness in incidents in which one or more of the participants leave the scene of the collision without exchanging information, such as in hit and run incidents, or incidents whereby an unoccupied vehicle is impacted with no witnesses.

Wireless communication devices have been proposed that exchange the information and data collected upon detection of an impact. However, these wireless communication devices have proven inadequate for identifying origins and participants of the impact, and therefore, exchanging the information and data collected in a reliable and secure manner. Other wireless communication devices have been proposed that regularly transmit vehicle identification and status information. However, the regular transmission of vehicle information is often objectionable due to privacy concerns of the driver. Accordingly, there exists a need in the art to overcome the deficiencies and limitations described hereinabove.

SUMMARY

In a first aspect of the invention, a method is provided for that includes determining whether an impact to a vehicle exceeds a predetermined threshold. The method further includes when the impact exceeds the predetermined threshold, sending a signal that includes impact information and identifier information stored in a persistent storage device.

The method further includes receiving one or more signals from one or more other vehicles within a predetermined proximity of the vehicle. The method further includes comparing impact information from the one or more signals to the impact information stored in the persistent storage device. The method further includes when the impact information from the one or more signals matches the impact information stored in the persistent storage device within a tolerance threshold, storing the impact information and identifier information from the one or more signals in the persistent storage device.

In another aspect of the invention, a computer program product is provided for selectively exchanging data regarding an impact to a vehicle. The computer program product includes a computer readable storage medium having program instructions embodied therewith. The computer readable storage medium is not a transitory signal per se, and the program instructions are readable by a computing device to cause the computing device to perform a method that includes determining whether the impact to the vehicle exceeds a predetermined threshold. The method further includes when the impact exceeds the predetermined threshold, determining a degree of the impact and recording impact information including the degree of the impact and a date and time of the impact in a persistent storage device. The method further includes sending a signal that includes the impact information and identifier information. The method further includes receiving one or more signals from one or more other vehicles within a predetermined proximity of the vehicle. The method further includes comparing a degree of impact and a date and time of impact from the one or more signals to the degree of the impact and the date and time of the impact stored in the persistent storage device to determine whether the one or more signals are indicative of a similar impact to the impact that exceeds the predetermined threshold. The method further includes when at least one of the degree of the impact and the date and time of the impact from the one or more signals matches at least one of the degree of the impact and the date and time of the impact stored in the persistent storage device within a tolerance threshold, store the date and time of the impact and identifier information from the one or more signals in the persistent storage device.

In a further aspect of the invention, a system is provided for that includes a CPU, a computer readable memory and a computer readable storage medium. The system further includes program instructions to determine whether an impact to a vehicle exceeds a predetermined threshold. The system further includes program instructions to send a signal that includes impact information and identifier information stored in a persistent storage device when the impact exceeds the predetermined threshold. The system further includes program instructions to receive one or more signals from one or more other vehicles within a predetermined proximity of the vehicle. The system further includes program instructions to compare impact information from the one or more signals to the impact information stored in the persistent storage device to determine whether the one or more signals are indicative of a similar impact to the impact that exceeds the predetermined threshold. The system further includes program instructions to store the impact information and identifier information from the one or more signals in the persistent storage device when the impact information from the one or more signals matches the impact information stored in the persistent storage device within a tolerance threshold. The program instructions are stored on the computer readable storage medium for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
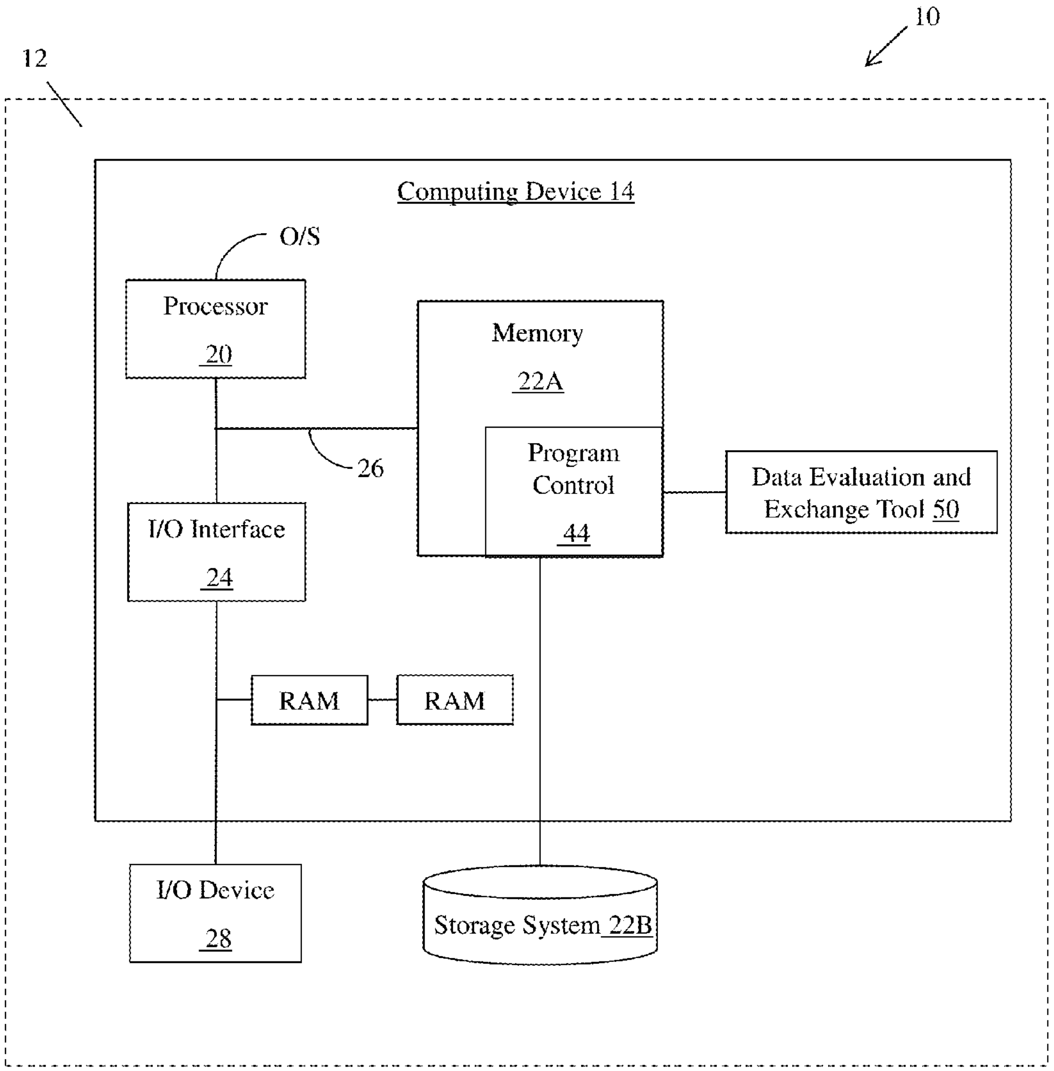
FIG. 1 shows an illustrative environment for implementing the steps in accordance with aspects of the invention.

The technical character of the present invention generally relates to vehicular impact detection and reporting, and more particularly, to systems and methods for identifying the origin of a vehicular impact and selectively exchanging data pertaining to the impact. More specifically, the present invention provides systems and methods that implement technical features such as monitoring, evaluation, and communication hardware and/or software that interoperate to track collision sources, and in some embodiments impact degrees, through data collected from on-board sensors, and record the incident details, e.g., time and date, enabling the vehicle owner, enforcement investigators, and/or insurance companies to track the impact back to an identifiable source at a specific time.

In embodiments, the technical features for monitoring a vehicle for an impact are accomplished through obtaining data from on-board sensors, which are configured to detect unexpected movement to the vehicle. The technical features for evaluating the data are accomplished through predetermined thresholds that are used to evaluate whether the unexpected movement to the vehicle is attributable to a collision with the vehicle or normal operation. In embodiments, evaluating the data may be accomplished dependent upon whether the vehicle is in motion or stopped. For example, a vehicle in motion may experience an innocuous jolt caused by a pothole, whereas the same jolt to a parked car may be evaluated as a recordable impact. In embodiments, the impact monitoring and detection may be accompanied by image captures taken from existing or dedicated cameras. Such images, (e.g., those which might be taken by a back-up camera), may be recorded as soon as unexpected movement to the vehicle is detected, and may further be used to provide a record of the collision.

In the event that unexpected movement is attributable to a collision with the vehicle, the technical features for selectively exchanging data pertaining to the impact includes each vehicle involved in the collision sending out an impact signal to the other vehicles involved in the collision and/or each vehicle involved in the collision receiving an impact signal from the other vehicles involved in the collision. If two or more vehicles within predetermined proximity have recorded such signals within a certain window of time, the two or more vehicles may exchange data (e.g., identification information and vehicle status information) that can be recovered by the vehicle owner, enforcement investigators, and/or insurance companies to track the impact back to an identifiable source at a specific time.

It is recognized that vehicle owners may not want personal information to be exchanged with other vehicle owners during the exchange of data between the two or more vehicles involved in the collision. For that reason, the data exchanged is anonymized data and the exchange is selective between only vehicles involved in the collision. For example, the identification information exchanged may only be Vehicle Identification Numbers (VINs) or tracking numbers issued by a responsible authority, e.g., the vehicle manufacturer or the Department of Motor Vehicles.

The advantage of the aforementioned technical solution of associating multiple vehicles impact sensing data and correlating which vehicles collided with each other, in which direction, time, etc., and then automatically facilitating the exchange of data (e.g., identification data) in such an event is that it will eliminate the technical problem of not exchanging the information and data collected at all or not exchanging the information and data collected in a reliable and secure manner. For example, implementations of the present invention provide a technical contribution over conventional vehicular impact detection and reporting systems and methods because the technical features of the present invention interoperate to identify responsible participants in a vehicular collision and selectively exchange information pertaining to the participants through safe and secure means without exchanging personal information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., graphic user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls a data evaluation and exchange tool 50, which performs processes described herein. The data evaluation and exchange tool 50 can be implemented as one or more program code in program control 44 stored in memory 22A as separate or combined modules. Additionally, the data evaluation and exchange tool 50 may be implemented as separate dedicated processors or a single or several processors to provide the function of the data evaluation and exchange tool 50. While executing the computer program code, the processor 20 can read and/or write data to/from memory 22A, storage system 22B, and/or I/O interface 24. The program code executes the processes of the invention. The bus 26 provides a communications link between each of the components in computing device 14.

By way of example, the data evaluation and exchange tool 50 may be configured to provide the functionality of obtaining data from continuously running on-board sensors, and evaluate the data using predetermined thresholds to determine whether the data is attributable to a collision with the vehicle or normal operation. In the event that the data is attributable to a collision, the data evaluation and exchange tool 50 may be further configured to provide the functionality of selectively exchanging data pertaining to the impact by (i) sending out an impact signal to the other vehicles involved in the collision and/or receiving an impact signal from the other vehicles involved in the collision, determining whether any vehicle within a predetermined proximity has a similar impact signal, and (iii) when a similar impact signal is determined, exchange data (e.g., identification information and vehicle status information) that can be recovered by the vehicle owner, enforcement investigators, and/or insurance companies to track the impact back to an identifiable source at a specific time.

The computing device 14 can comprise any general purpose computing article of manufacture capable of executing computer program code installed thereon (e.g., a personal computer, a mobile device, a server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
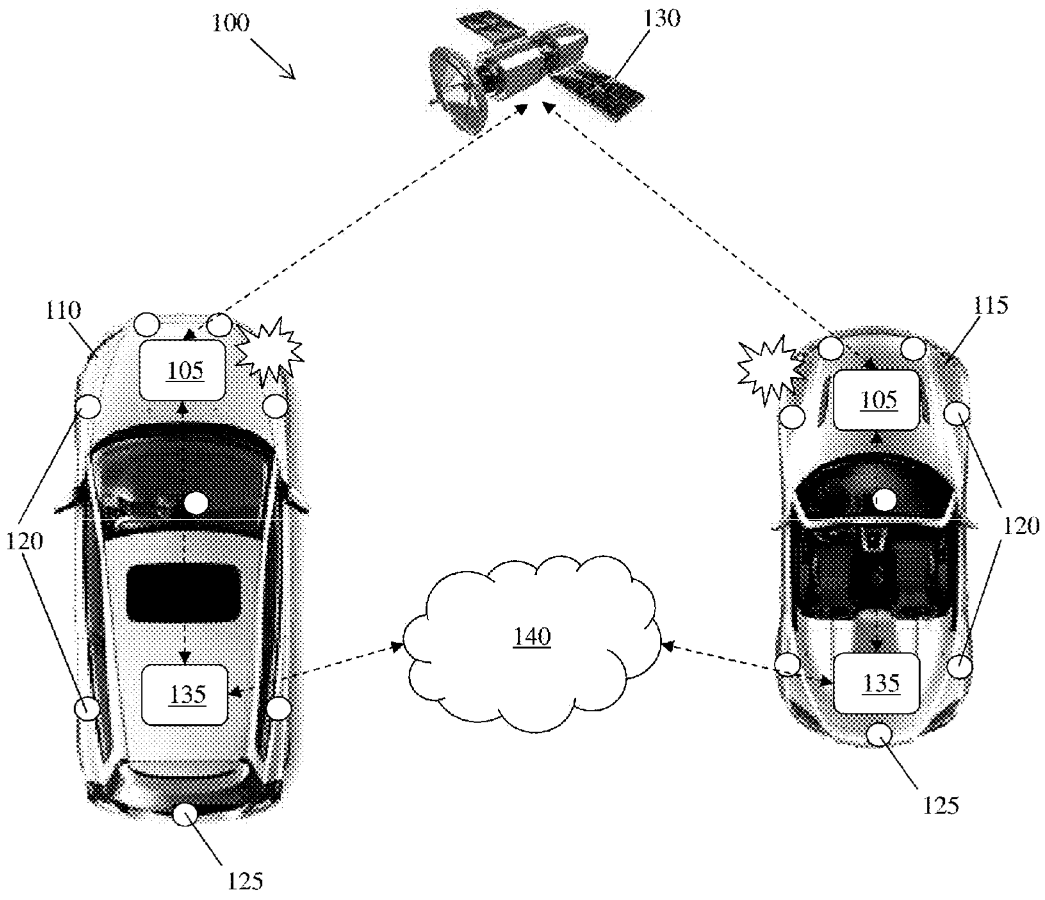
FIG. 2 shows a high level architecture for implementing processes in accordance with aspects of the invention.

FIG. 2 is a high level architecture for implementing processes in accordance with aspects of the present invention. More specifically, FIG. 2 depicts a vehicular collision system 100 in accordance with aspects of the present invention. In embodiments, the vehicular collision system 100 includes a vehicle data system 105 provided for in each vehicle 110 and 115 (e.g., one or more computers preinstalled in a vehicle during manufacture) that continually collects data from one or more sensors 120 (e.g., accelerometers, proximity sensors, air bag sensors, speedometer, tire pressure sensors, etc.), cameras 125 (e.g., back-up cameras, dash cameras, side view cameras, etc.), and/or satellites/antennas 130 (e.g., global positioning systems (GPS), satellite communication systems, etc.). The vehicular collision system 100 further includes an impact detection and data exchange system 135 (e.g., a computing device 14 comprising data evaluation and exchange tool 50 as described with respect to FIG. 1) provided in each vehicle 110 and 115 that is configured to use data collected from the one or more sensors 120, the cameras 125, and/or the satellites/antennas 130 to determine which vehicles collided with each other, in which direction, time, etc., and automatically facilitate the exchange of data between the vehicles that collided with each other via a network 140 (e.g., radio frequency, the Internet, a local area network, a wide area network, an ad hoc network, and/or a wireless network (WiFi)).

FIGS. 3-6 show exemplary flows for performing aspects of the present invention. The steps of FIGS. 3-6 may be implemented in the environment of FIG. 1, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
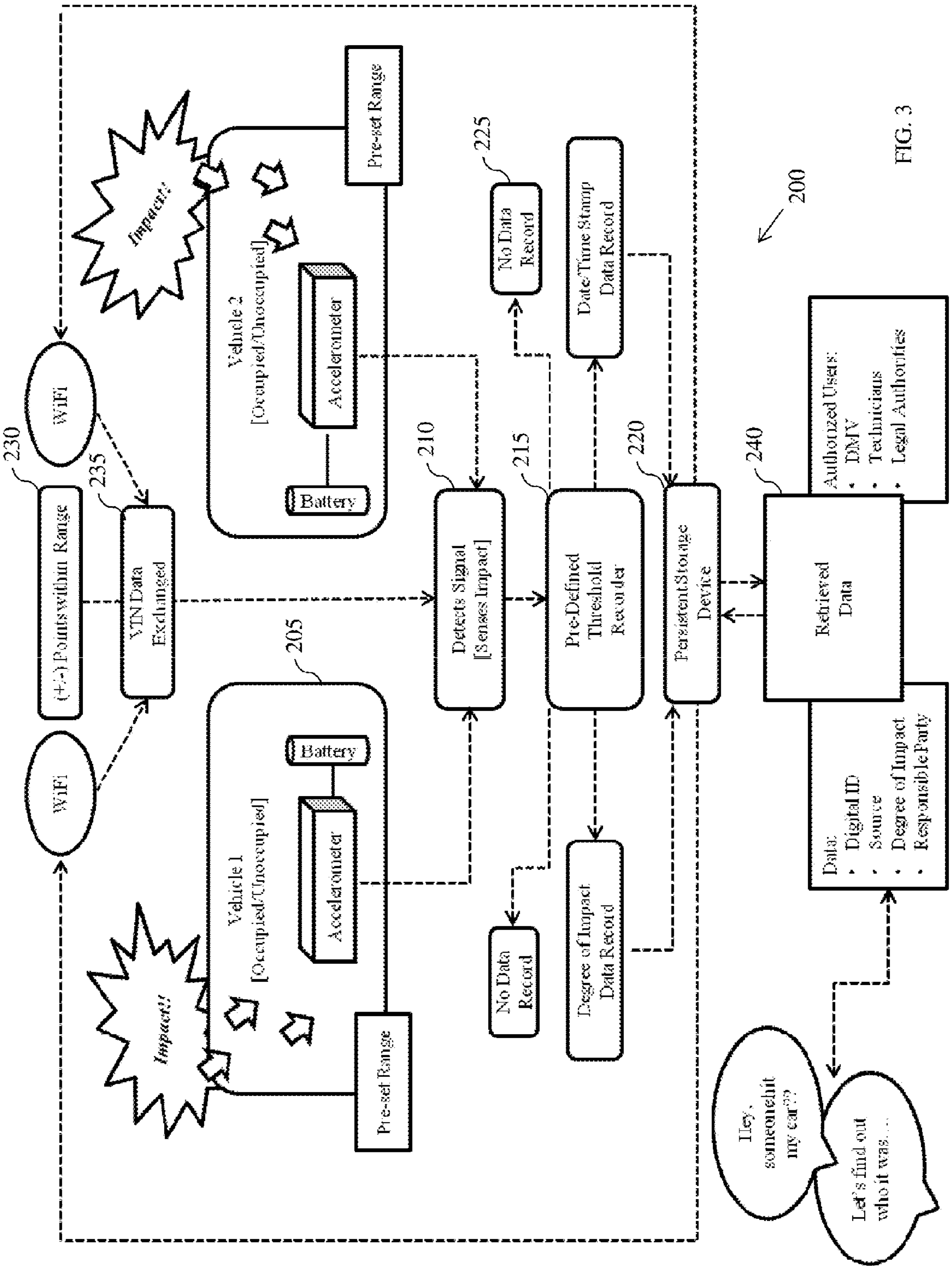
FIGS. 3-6 show exemplary flows in accordance with aspects of the invention.

FIG. 3 is a flow diagram illustrating an overview of a process 200 for determining an impact to a vehicle and selectively exchanging data regarding the impact in accordance with aspects of the present invention. The approach described herein pertains to the determination of an impact and subsequent selective data exchange between two vehicles: vehicle 1 and vehicle 2. In embodiments, vehicle 1 and vehicle 2 may be occupied and/or unoccupied or any combination thereof. Moreover, vehicle 1 and vehicle 2 each include a vehicular collision system as described with respect to FIG. 2 for implementing processes of the present invention as described with respect to FIG. 3. It should be understood to those of ordinary skill in the art that this approach may be implemented for any number of vehicles without departing from the spirit and scope of the present invention.

At step 205, data regarding a status of each vehicle (e.g., vehicle 1 and vehicle 2) is continuously collected using one or more sensors, such as multiple-axis accelerometers, and recorded to volatile memory within each respective vehicle.

In embodiments, at least the one of the one or more sensors are continuously active, either through their own rechargeable battery source or through the car battery.

At step 210, the collected data is continuously monitored to detect an impact to either or both vehicles (e.g., vehicle 1 and/or vehicle 2). At step 215, after an impact is detected to either or both vehicles (e.g., vehicle 1 and/or vehicle 2), a determination is made as to whether the impact exceeds one or more predefined thresholds (e.g., one or more predefined thresholds recorded within a persistent storage device such as non-volatile memory of each vehicle). At step 220, if the impact exceeds the one or more predefined thresholds, then the occurrence of the impact and vehicle status data (e.g., speed of the vehicle, turning angle of the wheels, tire pressure, operational status of the engine, etc) prior to and at the time of the impact are recorded in a persistent storage device (e.g., non-volatile memory) with a date and time stamp. Optionally, in embodiments, a degree of the impact may be determined and recorded with the occurrence of the impact and vehicle status data in the in a persistent storage device. At step 225, if the impact does not exceed the threshold, then the occurrence of the impact and vehicle status data is not recorded.

At step 230, after the impact is recorded, a determination is made as to whether another vehicle (e.g., vehicle 2) within a predetermined proximity of the vehicle (e.g., vehicle 1) experienced a similar impact. For example, upon recording of the impact, a signal, e.g., a radio frequency query, may be sent out from a vehicle (e.g., vehicle 1) that in affect provides the time of impact and identifier information. Furthermore, the signal may also include the degree of impact. The vehicle (e.g., vehicle 1) will simultaneously listen for a similar signal to be transmitted from another vehicle (e.g., vehicle 2) for purposes of determining whether any vehicles (e.g., vehicle 2) within a predetermined proximity of the vehicle (e.g., vehicle 1) experienced a similar impact within a tolerance threshold of differing time of impact and/or magnitude of impact (e.g., based on +/− points within range of the recorded time of impact and/or degree of impact to the vehicle (e.g., vehicle 1)). At step 235, if a similar signal is found, the vehicle (e.g., vehicle 1) will record information contained within the signal (e.g., the signal from vehicle 2), for example, the time of impact, identifier information, and/or optionally the degree of impact, in the persistent storage device (e.g., non-volatile memory). In embodiments, the identifier information exchanged within the signals may include anonymized data such as VINs or tracking numbers issued by a responsible authority, e.g., the vehicle manufacturer or the Department of Motor Vehicles.

At step 240, upon the exchange of data between the participants involved in the impact (e.g., the owners of vehicle 1 and vehicle 2), concerned parties (e.g., the owners of vehicle 1 and vehicle 2, law enforcement, insurance companies, emergency responders, etc) may be notified of the impact. Furthermore, data pertaining to the impact (e.g., digital identifiers of each vehicle, source of the impact, degree of the impact, time of the impact) with respect to each vehicle (e.g., vehicle 1 and vehicle 2) involved in the impact may be retrieved from the persistent storage device of either or both vehicles (e.g., vehicle 1 and/or vehicle 2) as previously recorded in steps 220 and 235 such that action may be taken to cover necessary liabilities. In embodiments, the data may be retrieved via a computer-assisted apparatus, which may be installed in-vehicle or in some other location (e.g., DMV, legal authorities, or automotive repair shops) to retrieve the data stored in the persistent storage device.

Figure 4:
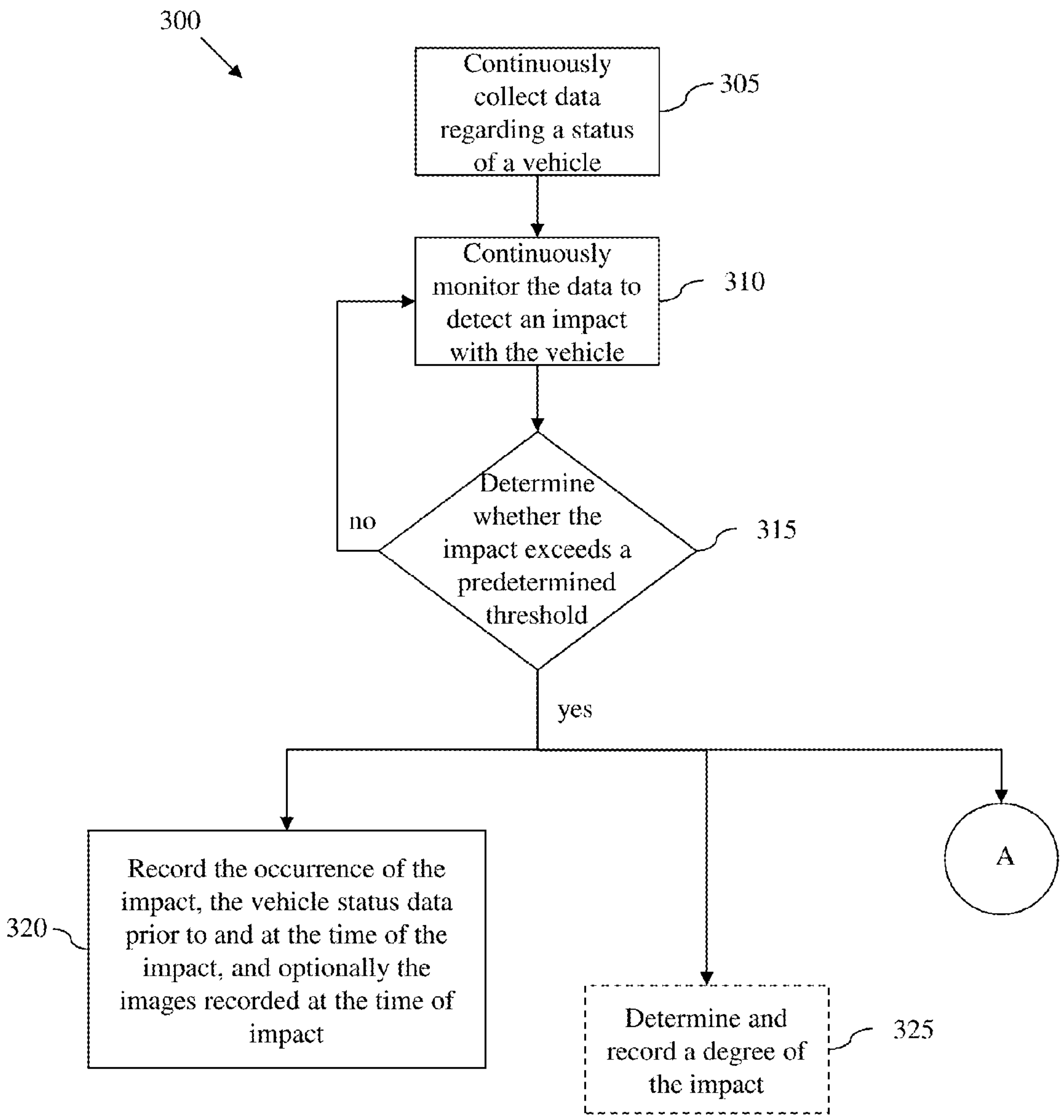

FIG. 4 is a flow diagram illustrating details of a process 300 for determining and recording an impact to a vehicle in accordance with aspects of the present invention. At step 305, data regarding a status of a vehicle is continuously collected using one or more sensors, such as multiple-axis accelerometers, and recorded to volatile memory. For example, a vehicle data system (e.g., vehicle data system 105 as described with respect to FIG. 2) provided for in each vehicle is configured to continually collect data from one or more sensors, cameras, and/or satellites/antennas, and store the collected data in volatile memory (e.g., RAM). At least the one or more sensors are continuously active, either through their own rechargeable battery source or through the car battery.

At step 310, the collected data is continuously monitored to detect an impact to the vehicle. For example, an impact detection and data exchange system (e.g., an impact detection and data exchange system 135 such as computing device 14 comprising a data evaluation and exchange tool 50, as described with respect to FIGS. 1 and 2) provided for in each vehicle is configured to continually monitor the collected data to detect an impact to the vehicle. In embodiments, detection of an impact may comprise determining a directional change in velocity of the vehicle based on data received from the one or more accelerometers. When an impact is detected, the vehicle data system may be configured to operate the cameras of the vehicle (e.g., in instances in which the cameras are not presently operating such as in the example of a back-up camera) to obtain images. The images will be recorded to the volatile memory as soon as the impact is detected, and may further be used to provide a record of the impact.

At step 315, when an impact is detected, a determination is made as to whether the detected impact exceeds a predetermined threshold. For example, the impact detection and data exchange system is further configured to calculate a magnitude of the impact from the directional change in velocity (e.g., from front to rear and across the vehicle) and the point of impact (e.g., from rotational components of acceleration changes), and compare the magnitude of impact to a predetermined threshold. In embodiments, the predetermined threshold may be selected based on a speed of the vehicle at the time of impact. For example, a vehicle in motion may experience an innocuous jolt caused by a pothole, whereas the same jolt to a parked car may be evaluated as a recordable impact. As such, the predetermined threshold for a vehicle in motion or above a certain speed may be selected to be higher than a predetermined threshold for a vehicle that is stopped or parked. When the impact does not exceed the predetermined threshold, the process returns to step 310 to continuously monitor the collected data to detect an impact to the vehicle.

At step 320, when the impact exceeds the predetermined threshold, the occurrence of the impact, the vehicle status data prior to and at the time of the impact, and optionally the images recorded at the time of impact are recorded in a persistent storage device with a date and time stamp. For example, the impact detection and data exchange system is further configured to record the occurrence of the impact, vehicle status data prior to and at the time of the impact, and optionally the images recorded at the time of impact in a persistent storage device (e.g., a non-volatile memory such as memory 22B as described with respect to FIG. 1) with a date and time stamp. In embodiments, the vehicle status data recorded along with the occurrence of the impact may include vehicle speed, braking status, wheel turning angle, GPS coordinates and/or direction of travel, etc., any or all of which may be recorded either instantaneously upon impact or during a predefined capture period including the time of impact, with the information capture period preferably beginning prior to impact.

Optionally at step 325, when the impact exceeds the predetermined threshold, a degree of the impact may be determined and recorded in the persistent storage device along with the occurrence of the impact, the vehicle status data prior to and at the time of the impact, and optionally the images recorded at the time of impact. For example, the impact detection and data exchange system is further configured to determine the degree of impact using a magnitude of the impact and a Richter or moment magnitude type scale, and store the degree of impact in the persistent storage device.

Figure 5:
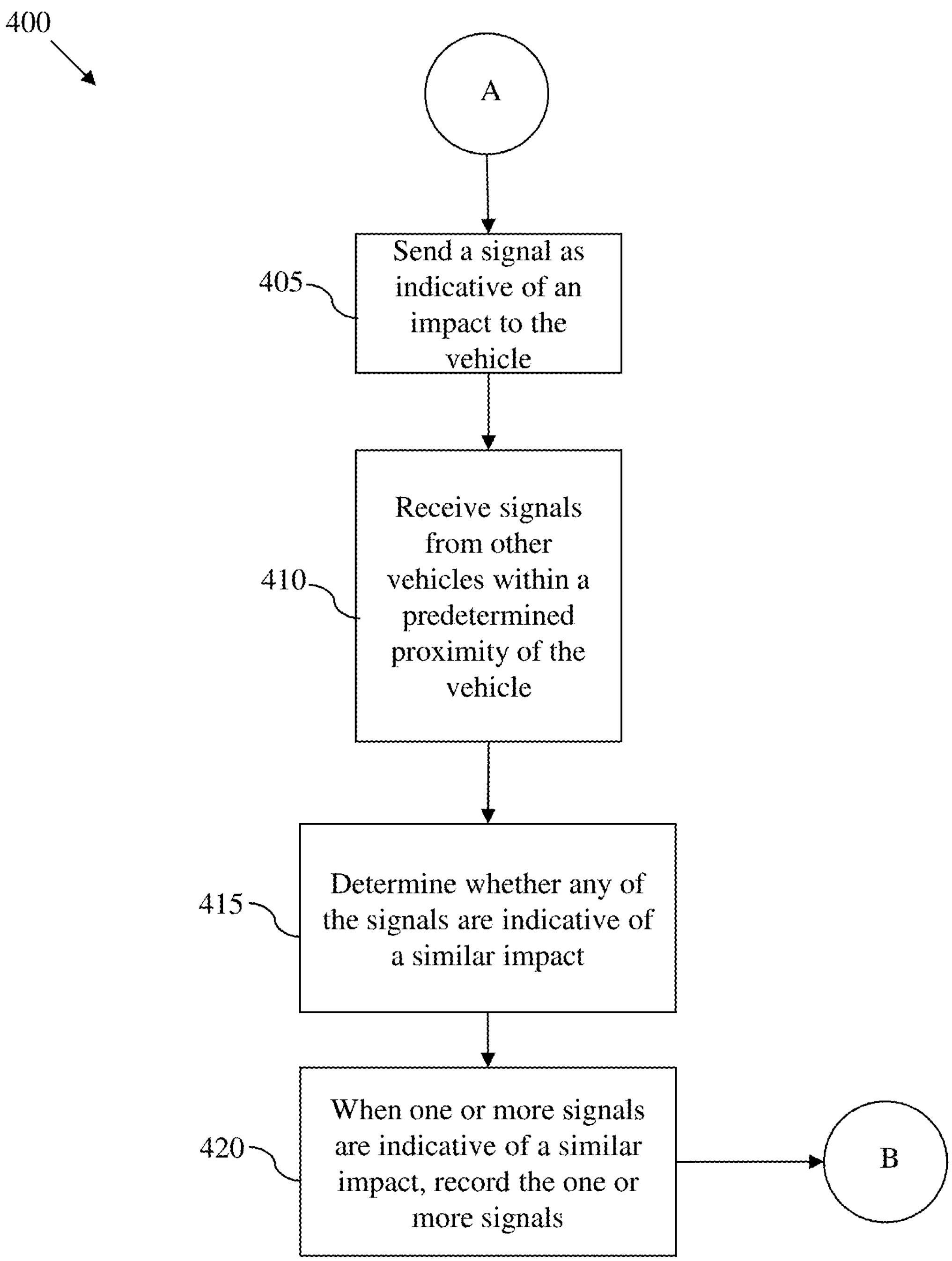

In additional or alternative embodiments, when the impact exceeds the predetermined threshold, the process proceeds to determine whether another vehicle had a similar impact within a pre-set distance or range of the vehicle determined to have an impact, as described in detail with respect to FIG. 5. More specifically, FIG. 5 is a flow diagram illustrating details of a process 400 for determining whether another vehicle had a similar impact within a pre-set distance or range of the vehicle determined to have an impact in accordance with aspects of the present invention. At step 405, upon detection of an impact to a vehicle that exceeds a predetermined threshold, a signal is sent out from the vehicle. For example, an impact detection and data exchange system (e.g., an impact detection and data exchange system 135 such as computing device 14 comprising a data evaluation and exchange tool 50, as described with respect to FIGS. 1 and 2) provided for in each vehicle is configured to send out a signal upon detection of an impact to the vehicle that exceeds a predetermined threshold. In embodiments, the signal is a radio frequency or Wi-Fi broadcast signal of a pre-set signal strength that includes the date and time of the impact and identifier information, which are retrievable from the persistent storage device. Optionally, the signal may also include the degree of the impact, which is also retrievable from the persistent storage device. As should be understood, the identifier information may be recorded in the persistent storage device at any point prior to impact detection, e.g., during manufacture of the vehicle.

At step 410, which is performed substantially simultaneously with step 405, the vehicle listens for any signals from other vehicles. For example, the impact detection and data exchange system is further configured to listen for any signals transmitted from other vehicles for purposes of determining whether any of the other vehicles within a predetermined proximity of the vehicle experienced a similar impact. In embodiments, the predetermined proximity may be specified as a predetermined Euclidean range from the vehicle that is dependent upon the pre-set signal strength of the signal.

At step 415, when the vehicle receives any signals from other vehicles within the predetermined proximity, information within the signals (e.g., the date and time of the impact and optionally the degree of impact) is compared to the information stored in the persistent storage device of the vehicle to determine whether any of the signals from the other vehicles indicate a similar impact. For example, the impact detection and data exchange system is further configured to compare information (e.g., the time and date of an impact, and optionally a degree of an impact) contained within each of the signals received from the other vehicles within the predetermined proximity to the information recorded within the persistent storage device that pertain to the detected impact. A match within a tolerance threshold between the information from a signal from one or more of the other vehicles and the information of the detected impact stored in the persistent storage device is indicative of a similar impact. In embodiments, the tolerance threshold may be set based on time such as +/− a number of seconds or minutes from the time of impact from one another, and/or optionally based on degree of impact such as +/− a number of magnitudes in impact from one another.

At step 420, when one or more of the signals received from the other vehicles are indicative of a similar impact, then the information included with the one or more signals is stored in the persistent storage device of the vehicle. For example, the impact detection and data exchange system is further configured to store the information (e.g., the date and time of the impact and the identifier information) included within the one or more signals in the persistent storage device of the vehicle when the one or more of the signals received from the other vehicles are indicative of a similar impact. Accordingly, the exchange and recording of the information within the signals is dependent upon a determination that the signals include similar impact information to the information pertaining to the impact stored in the persistent storage device. In embodiments, the identifier information exchanged within the signals may include anonymized data such as VINs or tracking numbers issued by a responsible authority, e.g., the vehicle manufacturer or the Department of Motor Vehicles.

Figure 6:
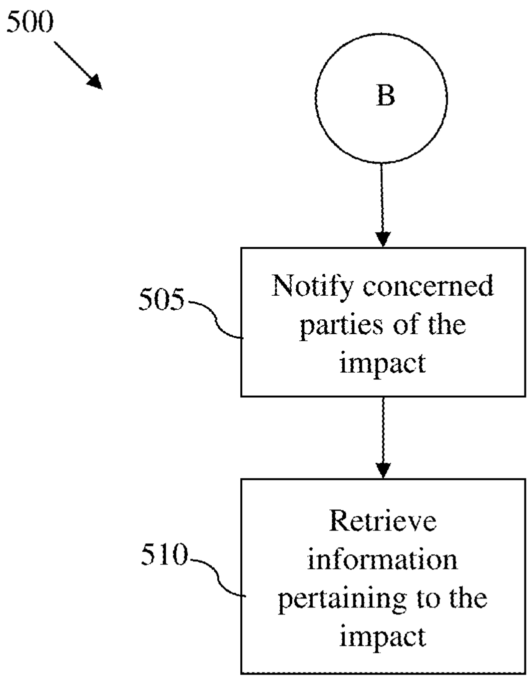

In additional or alternative embodiments, when the information included with the one or more signals is stored in the persistent storage device of the vehicle, concerned parties may be notified and the impact information may be retrieved from the persistent storage device, as described in detail with respect to FIG. 6. More specifically, FIG. 6 is a flow diagram illustrating details of a process 500 for notifying concerned parties of the impact and retrieving information regarding the impact from the persistent storage device in accordance with aspects of the present invention. At step 505, upon storing information included with the one or more signals in the persistent storage device of the vehicle, a notification of the impact may be sent to concerned parties. For example, an impact detection and data exchange system (e.g., an impact detection and data exchange system 135 such as computing device 14 comprising a data evaluation and exchange tool 50, as described with respect to FIGS. 1 and 2) provided for in each vehicle is configured to send a notification of the impact to concerned parties (e.g., the owners of the vehicle, law enforcement, insurance companies, etc). In embodiments, the notification may be an indicator light that provides notification of the storage of impact information. In additional or alternative embodiments, the notification may be a message on a control panel of the vehicle and/or a message sent wirelessly to concerned parties, e.g., via the Internet or cellular technology.

At step 510, the data and information pertaining to the impact may be retrieved from the persistent storage device. For example, an impact detection and data exchange system may be further configured to be accessed via a computer-assisted apparatus, which may be installed in-vehicle or in some other location (e.g., DMV, legal authorities, or automotive repair shops) to retrieve the data and information stored in the persistent storage device. In embodiments, the data and information stored in the persistent storage device may include: (i) the occurrence of the impact and vehicle status data prior to and at the time of the impact with a date and time stamp, and optionally the images recorded at the time of impact, as recorded in step 320 of FIG. 4; (ii) degree of the impact, as recorded in step 325 of FIG. 4; and (iii) information (e.g., the date and time of the impact and the identifier information) from the one or more of the signals received from the other vehicles that are indicative of a similar impact, as recorded in step 420 of FIG. 5. The data and information retrieved may allow the owner(s) of the one or more other vehicles to be traced by relevant authorities, so that necessary steps can be taken to cover necessary liabilities. Advantageously, through the embodiments of the present invention, new efficiencies are introduced by which the rule of law may be enforced, whether used with autonomous vehicles or manned vehicles, whether malice is intended or unintended, such that responsible parties to a vehicular collision may be identified through safe and secure means.

In additional or alternative embodiments, a method is provided for deploying a system for performing impact detection and data exchange for a subscriber in a computing environment. The method comprises providing a computer infrastructure being operable to perform any combination of the method steps and/or any combination of functionality of the computing environment disclosed and/or recited herein. For example, a service provider such as an insurance company may offer an incentive to consumers of their insurance to participate as subscribers of the impact detection and data exchange system and have such capability deployed or activated within the subscriber's vehicle. In return for participation in the impact detection and data exchange system, the service provider may provide the subscriber with benefits such as modified insurance rates.

The advantage of the aforementioned processes of associating multiple vehicles impact sensing data and correlating which vehicles collided with each other, in which direction, time, etc., and then automatically facilitating the exchange of data (e.g., identification data) in such an event is that it will eliminate the technical problem of not exchanging the information and data collected at all or not exchanging the information and data collected in a reliable and secure manner. For example, implementations of the present invention provide a technical contribution over conventional vehicular impact detection and reporting systems and methods because the technical features of the present invention interoperate to identify responsible participants in a vehicular collision and selectively exchange information pertaining to the participants through safe and secure means without exchanging personal information.

In embodiments, the invention provides a method that performs the process of the invention on a subscription, advertising, and/or fee basis. That is, a service provider, such as a Solution Integrator, could offer to provide the data collection, impact detection, and selective exchange of data functionality on a network. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In further embodiments, the invention provides a computer-implemented method for collecting data, detecting an impact of a vehicle, and the selectively exchanging data on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having computer executable code tangibly embodied on a computer readable storage medium having programming instructions configured for:

determining, using an impact detection and data exchange system within a vehicle, whether an impact to the vehicle exceeds a predetermined threshold;

when the impact exceeds the predetermined threshold, sending a signal, from the impact detection and data exchange system within the vehicle, that includes impact information and identifier information stored in a persistent storage device;

receiving, by the impact detection and data exchange system within the vehicle, one or more signals from one or more other vehicles within a predetermined proximity of the vehicle, which one or more other vehicles also each have an impact detection and data exchange system therein;

comparing, using the impact detection and data exchange system within the vehicle, impact information from the one or more signals from the one or more other vehicles, within the predetermined proximity of the vehicle, to the impact information stored in the persistent storage device of the vehicle to determine in the vehicle whether the one or more other vehicles indicate a similar impact to the impact experienced by the vehicle; and when the impact information from the one or more signals matches the impact information stored in the persistent storage device within a tolerance threshold, storing, in the impact detection and data exchange system within the vehicle, the impact information and identifier information from the one or more signals in the persistent storage device.

2. The method of claim 1, wherein the determining whether the impact to the vehicle exceeds the predetermined threshold comprises comparing a magnitude of the impact to the predetermined threshold, which is selected based on a speed of the vehicle at a time of the impact.

3. The method of claim 2, wherein the programming instructions are further configured for recording an occurrence of the impact, vehicle status data prior to and at the time of the impact, and any images recorded at the time of the impact in the persistent storage device with a date and time stamp when the impact exceeds the predetermined threshold.

4. The method of claim 3, wherein the programming instructions are further configured for determining a degree of the impact and record the degree of the impact in the persistent storage device when the impact exceeds the predetermined threshold.

5. The method of claim 4, wherein the impact information stored in the persistent storage device includes the date and time of the impact and the degree of the impact.

6. The method of claim 5, wherein impact information from the one or more signals includes a date and time of an impact and a degree of the impact.

7. The method of claim 6, wherein the comparing impact information comprises comparing the degree of impact and the date and time of impact from the one or more signals to the degree of the impact and the date and time of the impact stored in the persistent storage device.

8. The method of claim 7, wherein when at least one of the degree of the impact and the date and time of the impact from the one or more signals matches at least one of the degree of the impact and the date and time of the impact stored in the persistent storage device within the tolerance threshold, the date and time of the impact and identifier information from the one or more signals is stored in the persistent storage device.

9. The method of claim 8, wherein the programming instructions are further configured for sending a notification of the impact to a concerned party when the date and time of the impact and the identifier information from the one or more signals is stored in the persistent storage device.

10. The method of claim 9, wherein the predetermined proximity is based on signal strength of the signal, and the signal is a radio frequency or WiFi signal.

11. The method of claim 10, wherein the programming instructions are further configured for collecting data regarding a status of the vehicle and detecting the impact to the vehicle based on the collected data.

12. The method of claim 1, wherein a service provider at least one of creates, maintains, deploys and supports the computer infrastructure.

13. A computer program product for selectively exchanging data regarding an impact to a vehicle, the computer program product comprising a computer readable storage medium having program instructions embodied therewith, wherein the computer readable storage medium is not a transitory signal per se, and the program instructions are readable by a computing device to cause the computing device to perform a method comprising:

determining, using an impact detection and data exchange system within the vehicle, whether the impact to the vehicle exceeds a predetermined threshold;

when the impact exceeds the predetermined threshold, determining, in the impact detection and data exchange system within the vehicle, a degree of the impact and recording impact information including the degree of the impact and a date and time of the impact in a persistent storage device;

sending, from the impact detection and data exchange system within the vehicle, a signal that includes the impact information and identifier information;

receiving, by the impact detection and data exchange system within the vehicle, one or more signals from one or more other vehicles within a predetermined proximity of the vehicle, which one or more other vehicles also each have an impact detection and data exchange system therein;

comparing, using the impact detection and data exchange system within the vehicle, a degree of impact and a date and time of impact from the one or more signals from the one or more other vehicles, within the predetermined proximity of the vehicle, to the degree of the impact and the date and time of the impact stored in the persistent storage device of the vehicle to determine in the vehicle whether the one or more other vehicles indicates a similar impact to the impact experienced by the vehicle that exceeds the predetermined threshold; and when at least one of the degree of the impact and the date and time of the impact from the one or more signals matches at least one of the degree of the impact and the date and time of the impact stored in the persistent storage device within a tolerance threshold, storing, in the impact detection and data exchange system within the vehicle, the date and time of the impact and identifier information from the one or more signals in the persistent storage device.

14. The computer program product of claim 13, wherein the determining whether the impact to the vehicle exceeds the predetermined threshold comprises comparing a magnitude of the impact to the predetermined threshold, which is selected based on a speed of the vehicle at a time of the impact.

15. The computer program product of claim 13, wherein the predetermined proximity is based on signal strength of the signal.

16. The computer program product of claim 13, wherein the method further comprises sending a notification of the impact to a concerned party when the date and time of the impact and the identifier information from the one or more signals is stored in the persistent storage device.

17. A system comprising:

a CPU, a computer readable memory and a computer readable hardware storage device;

program instructions to determine, using an impact detection and data exchange system within a vehicle, whether an impact to the vehicle exceeds a predetermined threshold;

program instructions to send, from the impact detection and data exchange system within the vehicle, a signal that includes impact information and identifier information stored in a persistent storage device when the impact exceeds the predetermined threshold;

program instructions to receive, by the impact detection and data exchange system within the vehicle, one or more signals from one or more other vehicles within a predetermined proximity of the vehicle, which one or more other vehicles also each have an impact detection and data exchange system therein;

program instructions to compare, using the impact detection and data exchange system within the vehicle, impact information from the one or more signals from the one or more other vehicles, within the predetermined proximity of the vehicle, to the impact information stored in the persistent storage device of the vehicle to determine in the vehicle whether the one or more other vehicles indicates a similar impact to the impact experienced by the vehicle that exceeds the predetermined threshold; and program instructions to store, in the impact detection and data exchange system within the vehicle, the impact information and identifier information from the one or more signals in the persistent storage device when the impact information from the one or more signals matches the impact information stored in the persistent storage device within a tolerance threshold, wherein the program instructions are stored on the computer readable storage medium for execution by the CPU via the computer readable memory.

18. The system of claim 17, wherein the determining whether the impact to the vehicle exceeds the predetermined threshold comprises comparing a magnitude of the impact to the predetermined threshold, which is selected based on a speed of the vehicle at a time of the impact.

19. The system of claim 17, wherein the identifier information from the one or more signal includes anonymized data to identify the one or more other vehicles as being involved in the impact that exceeds the predetermined threshold.

20. The system of claim 17, wherein the predetermined proximity is based on a strength of the signal.

* * * * *